United States Patent [19]
Landy

[11] 3,880,897

[45] Apr. 29, 1975

[54] METHOD OF MAKING ACYL ESTERS OF HYDROXY ALKANE SULFONATES

[75] Inventor: Herbert G. Landy, Skokie, Ill.

[73] Assignee: The Gillette Company, Boston, Mass.

[22] Filed: Sept. 13, 1973

[21] Appl. No.: 397,018

[52] U.S. Cl. ................................................. 260/400
[51] Int. Cl....................... C07c 143/90; C08h 3/00
[58] Field of Search .................................... 260/400

[56] References Cited
UNITED STATES PATENTS 2,307,953  4/1943  Potter .................................. 260/400
3,151,136  9/1964  Koczorowski et al. ............. 260/400

*Primary Examiner*—Elbert L. Roberts

[57] ABSTRACT

Hydroxy alkane sulfonates are reacted with fatty acid halides by heating at reflux temperature in anhydrous dialkyl ketone having from 4 to 8 carbon atoms, then cooling below the boiling point and separating the insoluble solid product from the solution.

7 Claims, No Drawings

METHOD OF MAKING ACYL ESTERS OF HYDROXY ALKANE SULFONATES

This invention relates to a novel method for the preparation of acyl esters of hydroxy alkane sulfonates such as acyl isethionates and in particular to the use of a novel reaction medium for the reaction of fatty acyl halides and salts of hydroxy alkane sulfonic acids to form acyl esters.

Processes for the esterification of acids and alcohols are well known in the art, many processes for the synthesis of acyl isethionates being described in detail in "Surface Active Agents", Volume I, Schwartz and Perry, New York (1949) at pages 94–107. The useful methods in general comprise esterifications carried out with or without a solvent medium and with or without catalysts under a variety of pressure conditions and in contact with air or with other special atmospheres.

We have discovered that the reaction of a saturated or unsaturated fatty acid halide having from 8 to 22 carbon atoms with an ammonium or alkali metal salt of a hydroxy alkane sulfonic acid having from 2 to 4 carbon atoms can be carried out in an anhydrous medium in which there is formed a slurry containing the salt and the acid halide, the medium consisting of a dialkyl ketone having from 4 to 8 carbon atoms, by heating the mixture at the boiling point followed by cooling to a temperature below the boiling point and separating the insoluble solid product from the medium, with special advantages over processes previously known.

The reaction must be carried out under anhydrous conditions in order to avoid hydrolysis of the fatty acid halide and formation of undesired by-product. Because the ketones employed in the present invention form azeotropic mixtures with water, any slight amount of water present initially as an impurity can be removed simply by distilling off the azeotropic mixture. The medium can be maintained at its boiling point by refluxing it throughout the reaction thus accelerating the rate of reaction while at the same time ensuring maintenance of anhydrous conditions without the need for any specialized equipment. The fluidity of the slurry provided by the liquid ketone is also advantageous in avoiding the use of specialized equipment for handling and controlling highly viscous mixtures needed to obtain uniformity of reaction throughout the mixture and a uniform product, as is the case if the ketone is omitted and the reaction carried out in the absence of solvent or diluent. By refluxing the reaction mixture at ambient or atmospheric pressure effective mixing and stirring of the mixture to achieve uniformity is in most cases achieved without the need for mechanical stirring equipment, the stirring being provided by the boiling of the mixture.

Moreover, the solubility characteristics of the specified ketones, acid halides, hydroxy alkane sulfonates and the reaction products formed are such that the reaction mixture remains fluid not only throughout the reaction but even when cooled to room temperature after completion of the reaction, unlike the situation when aromatic media such as benzene and toluene are used, which tend to form gels making difficult the separation and purification of the product. The fluidity of the reaction mixture of the present invention after completion of the reaction greatly facilitates separation and purification of the product.

The fatty acid halides used in the process of the invention, of which the chlorides and bromides are preferred, particularly the chlorides, include those saturated and unsaturated fatty acid halides having from 8 to 22 carbon atoms such as caprylyl, pelargonyl, capryl, hendecanoyl, hendecenoyl, lauroyl, myristoyl, palmitoyl, oleoyl, linoleoyl, stearoyl, arachidoyl or behenoyl halides. The salts of the hydroxy alkane sulfonic acids used may be the ammonium or alkali metal such as sodium, potassium or lithium salts of such acids having from 1 to 4 carbon atoms, that is, salts having the structure $HO-R-SO_3-M$, where R is a lower alkylene group having from 1 to 4 carbon atoms and M is a cation such as ammonium, sodium, potassium or lithium. Of particular interest are the isethionate salts. Consequently, the acyl ester product has the structure $R'-COO-R-SO_3-M$ where R and M have the meanings given above and $R'CO-$ is the acyl group from the fatty acid halide, i.e., $R'$ is a saturated or unsaturated aliphatic hydrocarbon group having from 7 to 21 carbon atoms. The relative molar proportions of fatty acid halide to hydroxy alkane sulfonate may vary from 1:2 to 2:1, preferably from 1:1 to 1:1.1. The reaction can be carried out without a catalyst simply by heating the ingredients in the solvent, but preferably an alkaline catalyst is used such as an ammonium or alkali metal carbonate or bicarbonate in an amount from 5 to 75 mole percent of the fatty acid halide.

Any dialkyl ketone having from 4 to 8 carbon atoms or mixture of such ketones can be employed as the solvent in the reaction mixture, the reaction being carried out by heating the mixture at a temperature of about 70°–155°C. Among the dialkyl ketones which can be used are 2-butanone, 3,3-dimethyl-2-butanone, 2-pentanone, 3-methyl-2-pentanone, 3-pentanone, 2-methyl-3-pentanone, 2,4-dimethyl-2-pentanone, 2-hexanone, 3-hexanone, 3-methyl-2-hexanone, 5-methyl-2-hexanone, 4-methyl-3-hexanone, 2-heptanone, 4-heptanone, and 2-methyl-4-heptanone. While acetone itself cannot be used, a small amount up to 2 to 3 percent by weight of acetone may be present as an impurity in the ketone or mixture of ketones which is employed. The amount of dialkyl ketone solvent can be from 100 to 300 percent by weight of the total fatty acid halide and hydroxy alkane sulfonate.

In carrying out the reaction of the present process, it is preferred to slurry or suspend the hydroxy alkane sulfonate, and the alkaline catalyst if used, in the desired ketone or mixture of ketones, then heat the mixture to the boiling point to distill off any traces of water present in the form of an azeotropic mixture with the ketone. After removing the water and while the mixture is refluxing, the fatty acid halide, preferably previously heated to about the same temperature, is gradually added to the mixture. Refluxing can be continued for ten minutes to 6 hours in order to bring the reaction to completion, depending upon the particular reagents and the total volume employed. The reaction mixture is then allowed to cool, permitting precipitation and settling out of the insoluble fatty acid ester product. The product can then be separated from the reaction mixture by filtration, centrifugation, or any other conventional procedure, washed and dried in the usual manner.

The extent to which the reaction has proceeded, consequently the time when heating and refluxing of the reaction mixture can be stopped, can readily be determined by conventional tests. For example, the fatty acid halides are found to have characteristic infrared absorption bands when in solution in dialkyl ketones, the intensity of absorption being proportional to the concentration of the acid chloride. As a consequence, monitoring of the infrared absorption can be used as an indication of extent of reaction.

The products of the process of the present invention are useful as detergents, wetting agents, or foaming agents in a variety of compositions such as textile treating compositions, cosmetic compositions, industrial cleaning proudcts, etc. and as matrix builders in aqueous adhesive compositions as described and claimed in the copending application of Hutson et al. Ser. No. 287,555 filed Sept. 8, 1972.

The following specific examples are intended to illustrate more fully the nature of the present invention without acting as a limitation upon its scope.

EXAMPLES 1-4

There were introduced into a flask 320 grams (about 2.16 moles) of finely-ground sodium isethionate and 21 grams (0.2 mole) of anhydrous sodium carbonate. There were then introduced about 2.4 liters (1900 grams) of 4-methyl-2-pentanone (methyl isobutyl ketone). The mixture was heated to the boiling point and there was distilled off approximately one-half liter (400 grams) of the ketone solvent, thus removing as an azeotropic mixture with the ketone whatever small amount of water was present as an impurity. About 600 grams of stearoyl chloride (1.98 moles) was heated to 30°C. and placed in a dropping funnel from which it was introduced gradually over a thirty-minute period into the refluxing ketone solution of sodium isethionate and sodium carbonate which was maintained at reflux temperature. Heating and refluxing was continued for an additional 6 hours until substantially all of the stearoyl chloride had reacted as indicated by infrared absorption measurements. The reaction mixture was then cooled to 75°-85°C., filtered, and the insoluble solid product was slurried in about 2 liters of boiling methyl isobutyl ketone and again filtered. The moist filter cake was then slurried in about 7 liters of deionized water and the pH was adjusted to 9.0 by adding 10% aqueous sodium hydroxide. The product was separated from the water by filtration and the water slurrying procedure was repeated, the product finally being dried under vacuum at 65°C. for about 24 hours. The product weighed approximately 700 grams (about 85% of the theoretical yield based on stearoyl chloride) and displayed a pH of 8.3 in the form of a 1% by weight solution in water. It contained about 1.7% free fatty acid.

The procedure described above was repeated except that there was used in place of the methyl isobutyl ketone as the solvent, each of the following ketones in sequence, the percent yield in each case being the percentage of theoretical yield based upon stearoyl chloride:

| Ketone | % Yield |
| --- | --- |
| Methyl ethyl ketone[1] | 45.2 |
| 2-Pentanone | 70.3 |
| 2-Hexanone[2] | 71.5 |

[1] Reflux time approximately 12 hours.
[2] Reaction mixture foamy; high speed agitation used to control the foaming.

EXAMPLES 5-10

Into a one-liter three-neck round bottom flask fitted with a mechanical stirrer and condenser provided with a drying tube, there were introduced 320 milliliters (256 grams) of 4-methyl-2-pentanone, and amounts of sodium isethionate and of sodium carbonate as set forth in the following table. All glassware had previously been dried at 120°C. and assembled while hot. The flask was heated by means of an oil bath and when the temperature of the bath reached 120°C., there was introduced in 4 increments at 10 minute intervals an amount of each of the fatty acid chlorides listed in the following table corresponding to 0.33 mole. During the introduction of the fatty acid chloride, the bath temperature was increased to 130°-140°C. to ensure that refluxing continued. Heating and refluxing was continued for 10 minutes after the introduction of the last increment, and the reaction mixture was then cooled and filtered to remove the solid insoluble reaction product. The proudct was washed and purified as described in Example 1, the water washings being repeated until all chloride had been removed as shown by a silver nitrate solution test. The yield of product obtained expressed as a percentage of the theoretical yield based upon the fatty acid chloride employed was as set forth in the table.

| | Acid Chloride | Moles of Acid Chloride | Moles of Sodium Isethionate | Moles of Sodium Carbonate | Yield % |
| --- | --- | --- | --- | --- | --- |
| 5 | Stearoyl | 0.330 | 0.360 | 0.165 | 69 |
| 6 | Palmitoyl | 0.363 | 0.396 | 0.036 | 66 |
| 7 | Myristoyl | 0.405 | 0.442 | 0.040 | 69 |
| 8 | Lauroyl | 0.460 | 0.500 | 0.046 | 77 |
| 9 | Capryl | 0.250 | 0.272 | 0.025 | 83 |
| 10 | Caprylyl | 0.610 | 0.670 | 0.061 | 93 |

EXAMPLES 11-12

The procedure of Example 1 was repeated using in place of stearoyl chloride approximately 2 moles of a mixture containing 40% by weight of arachidic acid chloride and 60% by weight of behenic acid chloride. The product amounted to approximately 75% by weight of the theoretical based on the amount of fatty acid chloride.

What is claimed is:

1. The method of making an acyl ester of a hydroxy alkane sulfonate which comprises heating at the boiling point a mixture of a member of the group consisting of ammonium and alkali metal salts of a hydroxy alkane sulfonic acid having from 2 to 4 carbon atoms with an acylating agent selected from the group consisting of saturated and unsaturated fatty acid chlorides and bromides having from 8 to 22 carbon atoms in an anhydrous medium for said salt and for said acylating agent consisting of a dialkyl ketone having from 4 to 8 carbon atoms, cooling to a temperature below the boiling point, and separating the insoluble solid product from the solution.

2. The method as claimed in claim 1 in which the molar proportion of salt to acylating agent is from 1:2 to 2:1 and the acylating agent is acid chloride.

3. The method as claimed in claim 2 in which the amount of said medium is from 100 to 300% by weight of the total salt and acid chloride.

4. The method as claimed in claim 3 in which there is added to the reaction mixture a member of the group consisting of ammonium and alkali metal carbonates and bicarbonates in an amount from 5 to 75 mole percent of the acid chloride.

5. The method as claimed in claim 1 in which there is included in the mixture a member of the group consisting of ammonium and alkali metal carbonates and bicarbonates in an amount from 5 to 75 mole percent of the acylating agent.

6. The method as claimed in claim 1 in which the isethionate is first slurried in the ketone, the mixture is boiled to dehydrate it by evaporating a portion of the ketone from the mixture, and the acylating agent is introduced into the mixture gradually while heating and refluxing the mixture.

7. In a method of making an acyl isethionate which comprises reacting a member of the group consisting of ammonium and alkali metal isethionates having two carbon atoms with a saturated or unsaturated fatty acid chloride having from 8 to 22 carbon atoms in a molar ratio to said isethionate from 1:2 to 2:1 and with a member of the group consisting of ammonium and alkali metal carbonates and bicarbonates, the amount of said carbonates and bicarbonates being from 5 to 75 mole percent of the acid chloride, the steps which comprise using as the medium a dialkyl ketone having from 4 to 8 carbon atoms in an amount from 100 to 300% by weight of the total isethionate and acid chloride, mixing said isethionate and said carbonate or bicarbonate first with said dialkyl ketone, heating the mixture to the boiling point to evaporate sufficient dialkyl ketone to dehydrate the mixture, adding the acid chloride gradually to the mixture while heating and refluxing the mixture, and cooling the mixture to a temperature below the boiling point and separating the insoluble acyl isethionate product from the mixture.

* * * * *